(12) United States Patent
Belot et al.

(10) Patent No.: US 7,280,003 B2
(45) Date of Patent: Oct. 9, 2007

(54) MODULATION DEVICE AND TRANSMITTER COMPRISING SUCH A DEVICE

(75) Inventors: Didier Belot, Rives (FR); Vincent Le Goascoz, Claix (FR); Denis Pache, Grenoble (FR); Corinne Berland, Paris (FR); Jean-François Bercher, Champs sur Marne (FR); Isabelle Hibon, Vincennes (FR); Martine Villegas, Yerres (FR)

(73) Assignee: STMicroelectronics SA, Montrouge (FR)

( * ) Notice: Subject to any disclaimer, the term of this patent is extended or adjusted under 35 U.S.C. 154(b) by 90 days.

(21) Appl. No.: 11/137,104

(22) Filed: May 24, 2005

(65) Prior Publication Data

US 2006/0034391 A1 Feb. 16, 2006

(30) Foreign Application Priority Data

May 25, 2004 (FR) .................................. 04 05636

(51) Int. Cl.
*H03C 3/00* (2006.01)
(52) U.S. Cl. ...................................... 332/144; 332/145
(58) Field of Classification Search ................ 332/144, 332/145
See application file for complete search history.

(56) References Cited

U.S. PATENT DOCUMENTS 5,838,210 A 11/1998 Midya et al.

FOREIGN PATENT DOCUMENTS

FR 2 795 280 A 12/2000

OTHER PUBLICATIONS

Mark A. Briffa et al., "Dynamically Biased Cartesian Feedback Linearization", Personal Communication-Freedom Through Wireless Technology, Secaucus, NJ, May 18-20, 1993, Proceedings of the Vehicular Technology Conference, New York, IEEE, US, Vol. Conf. 43, pp. 672-675.
Yuanxun Wang, "A Class-S RF Amplifier Architecture with Envelope Delta-Sigma Modulation", IEEE Radio and Wireless Conference, Aug. 11, 2002, pp. 177-180.
Arun Jayaraman et al., "Linear High-Efficiency Microwave Power Amplifiers Using Bandpass Delta-Sigma Modulators", IEEE Microwave and Guided Letters, vol. 8, No. 3, Mar. 1998, pp. 121-123.
Poojan Wagh et al., "High-Efficiency Switched-Mode RF Power Amplifier", 42nd Midwest Symposium on Circuits and Systems IEEE, vol. 2, No. 8, Aug. 8, 1999, pp. 1044-1047.

*Primary Examiner*—Arnold Kinkead

(57) ABSTRACT

A signal modulation device comprises a delta-sigma modulator disposed for transforming an amplitude-modulation signal in baseband into a pulse signal. It also comprises a phase modulator receiving, at its input, analogue phase-modulation signals in baseband. The pulse signal is mixed with carrier signals upstream of the phase modulator. The modulation device is designed to form an input stage of a transmitter.

20 Claims, 2 Drawing Sheets

MODULATION DEVICE AND TRANSMITTER COMPRISING SUCH A DEVICE

TECHNICAL FIELD OF THE INVENTION

The present invention relates to a modulated signal generation device adapted to transmit a signal containing information encoded in baseband using both phase modulation and amplitude modulation. It also relates to a transmitter comprising such a device.

BACKGROUND OF THE INVENTION

The article "A Class-S RF Amplifier Architecture with Envelope Delta-Sigma Modulation" by Yuanxun Wang (IEEE 2002) describes a modulation device in which all of the information encoded in baseband using phase or amplitude modulation is transformed by a delta-sigma modulator before being transposed onto a carrier.

In the article "Linear High-Efficiency Microwave Power Amplifiers Using Bandpass Delta-Sigma Modulators" by Arun Jayaraman et al. (IEEE Microwave and Guided Wave Letters, Vol. 8, No. 3, March 1998), the base-band signals are converted into pulses using a bandpass delta-sigma modulator.

The document U.S. Pat. No. 5,838,210 describes a generator of modulated RF signals that implements a signal produced by a Phase-Width Modulator, or PWM. The principle of a PWM modulator, such as it is used in this document, is described in detail in the article "High-Efficiency Switched-Mode RF Power Amplifier" by Poojan Wagh et al. (IEEE 1999). The pulse widths are modulated as a function of the amplitude-modulation signal in baseband, and are phase-modulated as a function of the phase-modulation signal in baseband. The width- and phase-modulated pulse signal thus obtained is then amplified.

Because of the pulse-train form of the amplified signal, these devices need to be associated with a switched-mode, or class-S, amplifier in order to form a transmitter.

The present invention relates to a modulation device that produces a signal whose form does not require the use of a switched-mode amplifier.

FIG. 1 is a block circuit diagram of such a transmitter known to those skilled in the art. The transmitter comprises a signal modulation device that forms an input stage of the transmitter and a power stage disposed at the output. The modulation device comprises three input channels referenced E1, E2 and E3. The power stage is referenced S.

The input channels E1 and E2 are designed to each receive a base-band digital phase-modulation signal at the input. The input channel E1 comprises a digital delay gate 11 whose output is connected to a digital-to-analogue converter (DAC 1) 21. Similarly, the input channel E2 comprises a digital delay gate 12 whose output is connected to a digital-to-analogue converter 22. The input channels E1 and E2 each deliver, at the outputs of the converters 21, 22, an analogue phase-modulation signal with constant envelope. The input channel E1 delivers an in-phase signal I and the input channel E2 delivers an in-quadrature signal Q that is advanced with respect to the signal I (i.e. phase-shifted by +90°). The signals I and Q are variable with a frequency, for example, below 100 MHz.

A local oscillator 1, for example of the VCO (Voltage Controlled Oscillator) type, produces a high-frequency signal P0, for example at 5 GHz. The oscillator 1 is connected to an additional input of the modulation device, referenced E0. The signal P0 is transferred to an input of a phase-shifter 2 that produces, from the signal P0, two sinusoidal signals denoted P1 and P2 respectively at two outputs 2a and 2b. The signal P2, transferred on the output 2b, leads by one quadrature (+90°) with respect to the signal P1, transferred on the output 2a. The signals P1 and P2 form the carrier of the signal transmitted by the modulation device at its output.

An I/Q phase modulator, referenced 7, has two first inputs connected, respectively, to the outputs of the channels E1 and E2, and two second inputs connected, respectively, to the outputs 2a and 2b of the phase-shifter 2. In a known manner, the phase modulator 7 is equivalent to two multipliers 4 and 5 whose outputs are connected to respective inputs of a subtractor 6. The multiplier 4 receives the signals I and P1 at its input and the multiplier 5 receives the signals Q and P2 at its input. The subtractor 6 then delivers at its output a sinusoidal signal V having the frequency of the oscillator 1 and phase-modulated according to I and Q.

The input channel E3 receives a base-band digital amplitude-modulation signal at its input. It comprises a digital delay gate 13 whose output is connected to a digital-to-analogue converter 23. The output of the converter 23 delivers an analogue amplitude-modulation signal A. The signal A varies much more slowly than the signal P0.

The output of the converter 23 is connected to an input of a delta-sigma modulator 8. The delta-sigma modulator 8 is of the 1-bit type and of order n. Such a modulator is known to those skilled in the art. The quantization noise generated by the delta-sigma modulator 8 corresponds to frequencies situated beyond the low-pass cut-off frequency of the transmitter, such that it is filtered out. A synchronization input of the delta-sigma modulator 8 is, furthermore, connected to the input E0 in order to receive the signal P0 as sampling signal. In a known manner, the delta-sigma modulator 8 produces a signal C at its output that is composed of a pulse train with a pulse rate equal to the frequency of the signal P0 and pulse lengths determined as a function of the variations of the signal A.

The respective outputs of the phase modulator 7 and of the delta-sigma modulator 8 are connected to two respective inputs of a multiplier 3. The low and high levels of the pulses of the signal C correspond, for example, to the digital values −1 and +1. The multiplier 3 produces a signal W at its output corresponding to the phase-modulated signal V, with phase jumps of +/−π corresponding to the rising or falling edges of the pulses of the signal C. The encoding of the information in baseband that is then obtained is the following: the continuous modulations of the phase of the signal W correspond to the phase modulation in baseband, and the discontinuities in the phase of the signal W correspond to the amplitude modulation in baseband.

The phase-shifter 2, the phase modulator 7 and the multiplier 3 form a signal mixer 100, denoted MIXER.

The power stage S comprises an amplifier 101 with its output connected to a bandpass filter 102. The filter 102 is chosen depending on the allocated transmission frequency band. Its high cut-off frequency allows the quantization noise generated by the delta-sigma modulator 8, situated beyond this frequency, to be eliminated. The output of the filter 102 is connected to a transmission antenna.

Thanks to the encoding performed, the transmission of information from baseband to the antenna is quite insensitive to the distortions introduced by the amplifier 101. A high-efficiency amplifier can therefore be employed, operating in a linear, saturated or switched-mode regime.

A transmitter according to FIG. 1 therefore comprises two signal mixing stages. The first stage is formed by the multipliers 4 and 5, disposed in parallel, and the second stage is formed by the multiplier 3. These two stages are separated by the subtractor 6.

One drawback of a transmitter of the preceding type comes from the proximity between the delta-sigma module 8 and the amplifier 101. Indeed, these two components are only separated by the multiplier 3. A significant part of the noise generated by the module 8 is therefore amplified and transferred to the transmission antenna.

SUMMARY OF THE INVENTION

To address the above-discussed deficiencies of the prior art, a subject of the present invention is therefore a signal modulation device for which the noise transmitted at its output is reduced.

The invention relates to a signal modulation device comprising:
  one input channel for a high-frequency signal;
  two input channels adapted to deliver analogue phase-modulation signals with constant amplitude, in phase and in quadrature, respectively;
  an input channel comprising a delta-sigma modulator arranged for receiving an analogue amplitude-modulation signal at its input and for delivering a pulse signal at its output; and
  a mixer having inputs respectively connected to the input channel of the high-frequency signal, to the input channels of the phase-modulation signals, and to the output of the delta-sigma modulator.

The mixer is arranged for producing, at its output, a signal substantially proportional to a subtraction between:
  on the one hand, a first signal equal to the in-phase analogue phase-modulation signal multiplied by a first sinusoidal carrier signal and by the pulse signal, and
  on the other hand, a second signal equal to the in-quadrature analogue phase-modulation signal multiplied by a second sinusoidal carrier signal and by the pulse signal.

In a modulation device according to the invention, the mixer comprises:
  a phase-shifter connected to the high-frequency signal input channel and adapted to produce at two respective outputs said first and second sinusoidal carrier signals with quadrature phase shifts relative to each other;
  a multiplier connected by respective inputs to the output of the delta-sigma modulator and to the outputs of the phase-shifter and adapted to produce, at two outputs of said multiplier, signals proportional to the pulse signal multiplied by one of said first and second sinusoidal carrier signals, respectively; and
  a phase modulator having two first inputs respectively connected to the input channels of the phase-modulation signals and two second inputs respectively connected to the outputs of the multiplier.

Thus, in a modulation device according to the invention, the amplitude-modulation signal is firstly converted into a pulse signal then mixed with the high-frequency signal. Two carrier signals coming from this combination are then respectively combined with each of the phase-modulation signals by means of an I/Q phase modulator. Thanks to this sequence, the noise generated by the delta-sigma modulator comprised in the signal produced by the phase modulator is reduced.

One advantage of a modulation device according to the invention results from the fact that the input channel of the amplitude-modulation signal is connected to the multiplier upstream of the respective connections of the input channels of the phase-modulation signals to the phase modulator. Thanks to this configuration, the amplitude-modulation signal and each of the phase-modulation signals exhibit reduced phase shifts. The synchronization of the modulation signals delivered by the input channels therefore only requires the implementation of small delay values.

Another advantage of a modulation device according to the invention results from the operation of the phase modulator. Indeed, the output of the phase modulator exhibits a switching rate corresponding to the operation of the delta-sigma modulator. This rate is lower than the rate of variation of the carrier signals. The result of this is a reduction in the power consumption of the phase modulator with respect to the case where the phase modulator is connected directly to the output of the phase shifter. Furthermore, the contribution of the phase modulator itself to the output signal noise of the modulation device is also reduced.

A transmitter according to FIG. 2 therefore only comprises a single signal mixing stage, formed by the multipliers 3, 4 and 5. Indeed, the outputs 3a and 3b of the multiplier 3 are directly connected to the inputs of the multipliers 4 and 5. This single mixing stage therefore globally combines the carrier signals P1 and P2 with the signals I and Q.

Another subject of the invention is a transmitter comprising a modulation device such as is described above.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; and the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

Other features and advantages of the present invention will become apparent in the following description of a non-limiting exemplary embodiment presented with reference to the appended drawings, in which like reference numerals represent like parts, in which.

Identical references used in FIGS. 1 and 2 correspond to identical elements, or elements that have equivalent functions.

DETAILED DESCRIPTION OF THE INVENTION

Figure 1:
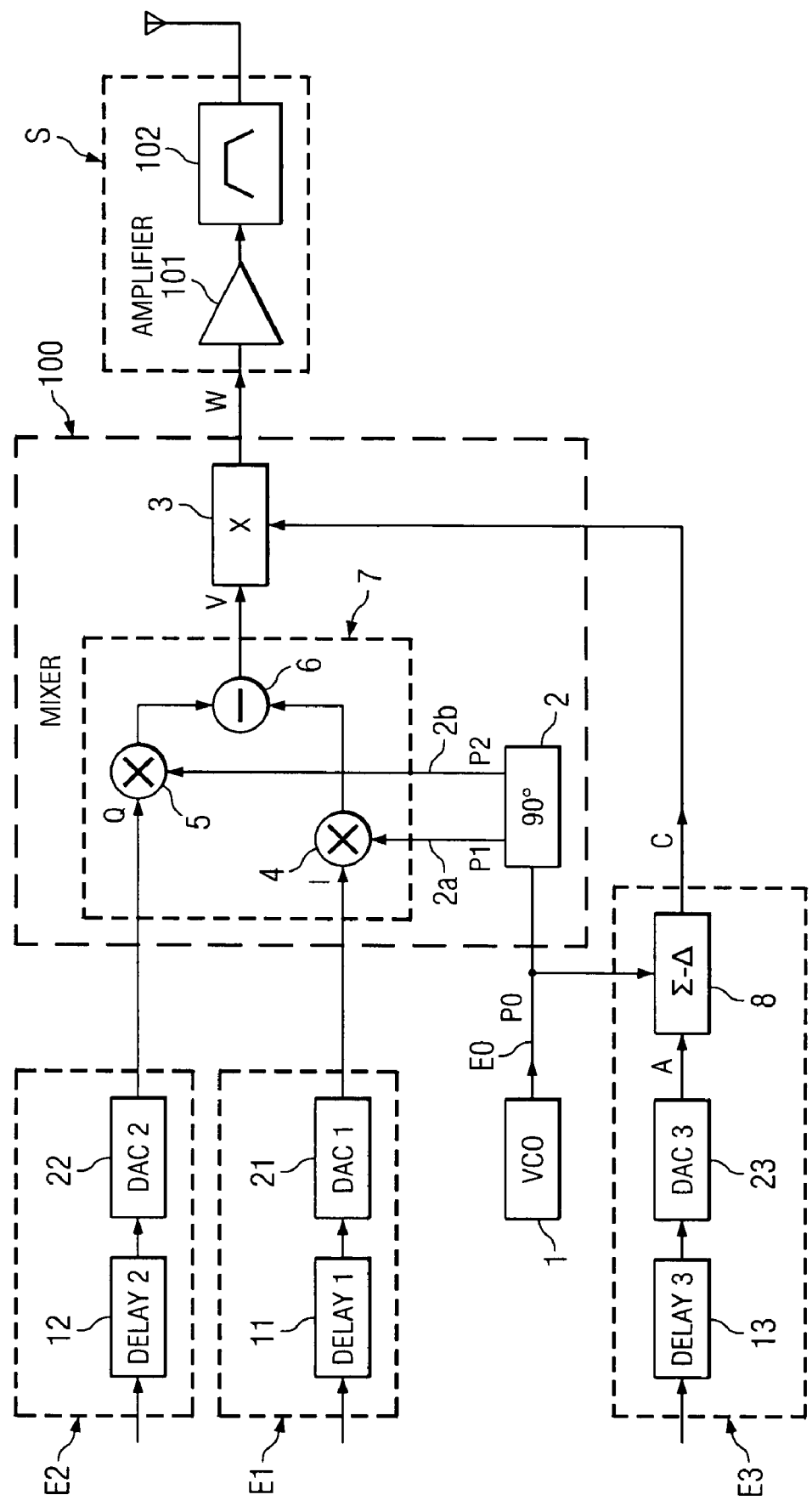
FIG. 1, already described above, is a block circuit diagram of a known transmitter.
Figure 2:
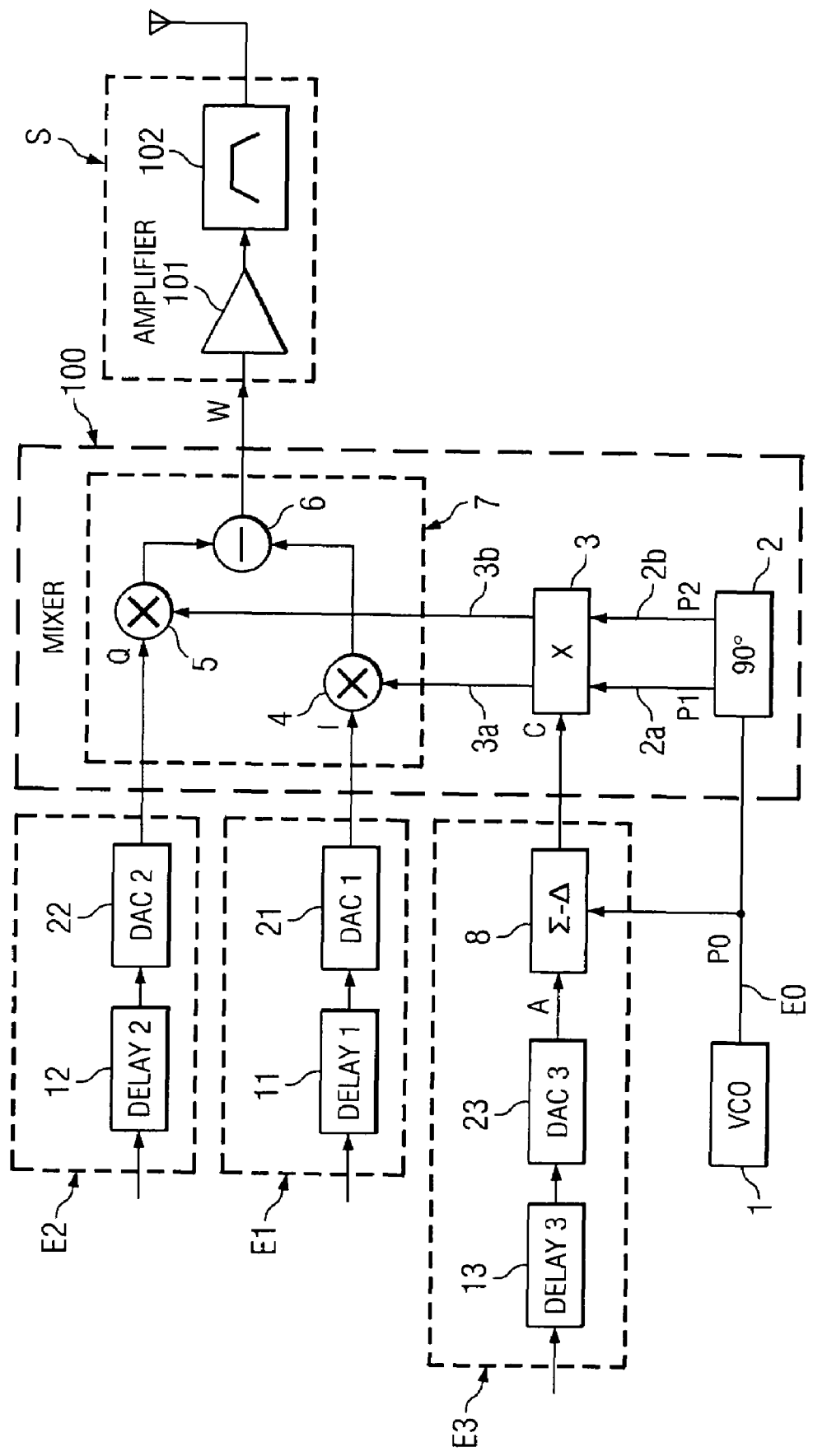
FIG. 2 is a block circuit diagram of a transmitter comprising a modulation device according to the invention.

FIGS. 1 and 2, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged modulated signal generation device and any transmitter comprising such a device.

A transmitter such as will now be described in detail again comprises a signal modulation device as input stage and a power stage S disposed at the output. The modulation device comprises input channels E0, E1, E2 and E3 that are identical to those described with reference to FIG. 1. The power stage S is also identical to that described above.

In particular, the input channels for the phase-modulation signals E1 and E2 each comprise a digital-to-analogue converter, 21, 22 respectively, connected to an output of a digital delay gate, 11, 12 respectively. The converters 21 and 22 respectively deliver the base-band analogue phase-modulation signals I and Q, with constant envelopes, at their outputs.

The base-band analogue phase-modulation signals I and Q, with constant amplitude, can be respectively expressed in the form $\cos\phi(t)$ and $\sin\phi(t)$, cos and sin denoting the functions cosine and sine. The variations of the function $\phi(t)$ therefore correspond to the phase modulation in baseband.

The input channel of the amplitude-modulation signal E3 comprises a delay gate 13. The delay gate 13 can also be of the digital type. In this case, a digital-to-analogue converter 23 is disposed at the output of the delay gate 13. The converter 23 therefore delivers an analogue signal A at its output corresponding to the amplitude modulation in baseband. The signal A is transferred to the input of the delta-sigma modulator 8.

The synchronization between the signals I and Q, respectively delivered by the channels E1 and E2, and the output signal C from the delta-sigma modulator 8 can be obtained by a Farrow interpolator (not shown). By way of an example, the synchronization delays introduced into each of the channels E1, E2 and E3 can be DELAY 1=DELAY 2=1.0 microsecond, DELAY 3=0.5 microsecond.

The high-frequency signal input channel E0 can, in addition, be connected to a synchronization input of the delta-sigma modulator 8. The rate of the pulse signal delivered by the delta-sigma modulator 8 is therefore equal to the frequency of the signal P0.

A mixer 100 is connected, at its inputs, to the channels E0, E1, E2 and E3 and, at its output, to the power stage S. The mixer 100 comprises a phase shifter 2, a multiplier 3 and a phase modulator 7.

The high-frequency signal P0 is transferred to the input of the phase shifter 2. From the signal P0, the phase shifter 2 produces two sinusoidal signals denoted P1 and P2 on respective outputs 2a and 2b. The signal P2 has a phase lead of 90° with respect to the signal P1. The signals P1 and P2 have substantially identical amplitudes. They are therefore, respectively, of the form $\cos(\omega,t)$ and $\sin(\omega,t)$, where t denotes the time variable and $\omega$ is the frequency of the carrier signal associated with P1 and P2. The phase shifter 2 can be of the Thomson divider type, known to those skilled in the art. In this case, the frequency $\omega$ is equal to half the frequency of the signal P0.

The multiplier 3 has a first input connected to the output of the delta-sigma modulator 8 in order to receive the pulse signal C. It also has two second inputs connected, respectively, to the outputs 2a and 2b of the phase shifter 2. The multiplier 3 carries out, in parallel, the following two operations: multiplication of the signals C and P1, on the one hand, and multiplication of the signals C and P2, on the other. Consequently, at two outputs 3a and 3b, respectively, of the multiplier 3, it produces two signals corresponding, respectively, to $c(t)\times\cos(\omega,t)$ and $c(t)\times\sin(\omega,t)$, where $c(t)$ represents the variations of the signal C.

The phase modulator 7 has four inputs connected in the following manner:
two first inputs are connected to the outputs of the converters 21 and 22 of the input channels E1 and E2, respectively, and
two second inputs connected, respectively, to the outputs 3a and 3b of the multiplier 3.

The phase modulator 7 can be of a usual type. It is then equivalent to two multipliers 4 and 5 each connected at their outputs to two inputs of a subtractor 6. The multiplier 4 carries out a multiplication of the signal I by the signal received at the input of the modulator 7 connected to the output 3a of the multiplier 3. The multiplier 5 carries out, in parallel, a multiplication of the signal Q by the signal received at the input of the modulator 7 connected to the output 3b of the multiplier 3. The signal W produced at the output of the phase modulator 7 is then proportional to:

$$\cos\omega(t)\times c(t)\times\cos(\omega,t) - \sin\omega(t)\times c(t)\times\sin(\omega,t) = c(t)\times\cos[\omega.t+\phi(t)].$$

Since the function $c(t)$ only takes values equal to $-1$ or $+1$, the variations of the signal W can be expressed in the form: $\cos[\omega.t+\phi(t)+\alpha.\pi]$, where $\alpha$ is equal to $-1$ and $+1$ depending on the instantaneous value of the pulse signal C. The base-band phase- and amplitude-modulation information is therefore encoded only in the form of a phase modulation of the output signal W. The signal W, consequently, has a constant envelope. The transmission of the information contained in the signal W is therefore quite insensitive to the non-linear-type amplification defects of the amplifier 101.

According to an advantageous embodiment, the multiplier 100 is implemented in the form of a single integrated circuit module comprising phase shifter 2, the multiplier 3 and the phase modulator 7. The reduction thus obtained in the length of the electrical connections between these components allows the noise on the output signal W to be diminished. Such an embodiment is also particularly inexpensive and allows a compact transmitter to be obtained at a low cost.

Finally, even though a signal modulation device according to the present invention is especially adapted for a transmitter application, it will be understood that such a device can be used for another application. It is then associated with an output stage other than a transmitter power stage such as is described above. It is intended that the present invention encompass such changes and modifications as fall within the scope of the appended claims.

What is claimed is:

1. A signal modulation device comprising:
one input channel for a high-frequency signal (P0);
two input channels adapted to deliver analogue phase-modulation signals with constant amplitude, in phase and in quadrature, respectively;
an input channel comprising a delta-sigma modulator arranged for receiving an analogue amplitude-modulation signal at its input and for delivering a pulse signal at its output; and
a mixer having inputs respectively connected to the input channel of the high-frequency signal, to the input channels of the phase-modulation signals, and to the output of the delta-sigma modulator, said mixer being arranged for producing, at its output, a signal substantially proportional to a subtraction between:

on the one hand, a first signal equal to the in-phase analogue phase-modulation signal multiplied by a first sinusoidal carrier signal and by the pulse signal, and on the other hand, a second signal equal to the in-quadrature analogue phase-modulation signal multiplied by a second sinusoidal carrier signal and by the pulse signal, wherein the mixer comprises:

a phase-shifter connected to the high-frequency signal input channel and adapted to produce at two respective outputs said first and second sinusoidal carrier signals with quadrature phase shifts relative to each other;

a multiplier connected by respective inputs to the output of the delta-sigma modulator and to the outputs of the phase-shifter, and adapted to produce, at two outputs of said multiplier, signals proportional to the pulse signal multiplied by one of said first and second sinusoidal carrier signals, respectively; and a phase modulator having two first inputs respectively connected to the input channels of the phase-modulation signals and two second inputs respectively connected to the outputs of the multiplier.

2. The signal modulation device according to claim 1, wherein the high-frequency signal input channel is also connected to a synchronization input of the delta-sigma modulator.

3. The signal modulation device according to claim 1, wherein the input channels of the phase-modulation signals each comprise a digital-to-analogue converter connected to an output of a digital delay gate.

4. The signal modulation device according to claim 1, wherein the input channel of the amplitude-modulation signal comprises a delay gate.

5. A transmitter comprising the signal modulation device of claim 1.

6. A signal modulation device, comprising:

a mixer connected to receive an in-phase signal, a quadrature signal corresponding to the in-phase signal, a pulse signal, and a high-frequency input signal, and configured to produce an output signal substantially proportional to a subtraction between a first signal corresponding to the in-phase signal multiplied by a first sinusoidal carrier signal and by the pulse signal, and a second signal corresponding to the quadrature signal multiplied by a second sinusoidal carrier signal and by the pulse signals, wherein the mixer includes a multiplier connected to receive the pulse signal and the first and second sinusoidal carrier signals, and configured to produce output signals proportional to the pulse signal multiplied by one of said first and second sinusoidal carrier signals, respectively.

7. The signal modulation device of claim 6, wherein the first and second sinusoidal carrier signals with have quadrature phase shifts relative to each other and correspond to the high-frequency input signal.

8. The signal modulation device of claim 6, further comprising a delta-sigma modulator configured to receive an amplitude-modulation input signal and to produce the pulse signal, wherein the pulse signal corresponds to the amplitude-modulation input signal.

9. The signal modulation device of claim 8, wherein the delta-sigma modulator is further configured to receive the high-frequency input signal at a synchronization input.

10. The signal modulation device of claim 6, further comprising a power stage connected to receive the output signal of the mixer, the power stage including an amplifier and a bandpass filter.

11. The signal modulation device of claim 6, wherein the mixer includes phase modulator connected to receive the in-phase signal, the quadrature signal, and output signals of the multiplier.

12. The signal modulation device of claim 6, further comprising first and second input stages connected to receive a base-band digital phase-modulation signal and to produce the in-phase signal and quadrature signals, respectively.

13. The signal modulation device of claim 12, wherein the first and second input stages each include a delay stage and a digital-to-analog converter.

14. The signal modulation device of claim 6, further comprising an oscillator configured to generate the high-frequency signal.

15. The signal modulation device of claim 6, further comprising a third input stage connected to receive a base-band digital amplitude-modulation signal and the high-frequency signal, and configured to produce the pulse signal.

16. The signal modulation device of claim 15, wherein the third input stage includes a delay stage, a digital-to-analog converter connected to the delay stage, and a delta-sigma modulator connected to the digital-to-analog converter.

17. The signal modulation device of claim 6, further comprising a power stage connected to receive the output signal of the mixer and configured to produce an amplified and filtered transmission signal corresponding to the output signal of the mixer.

18. A signal modulation device configured to receive a base-band digital amplitude-modulation signal and configured to produce an output signal corresponding to the base-band digital amplitude-modulation signal, the output signal containing information encoded in baseband using both phase modulation and amplitude modulation, the signal modulation device including at least a delta-sigma modulator stage configured to convert the base-band amplitude-modulation signal into a pulse signal, and wherein the pulse signal is multiplied with first and second carrier signals generated by a local oscillator in a mixer stage which includes a multiplier to receive the pulse signal and the first and second carrier signals, and configured to produce output signals proportional to the pulse signal multiplied by one of said first and second carrier signals, respectively.

19. The signal modulation device of claim 18 further wherein the mixer stage is configured to produce the output signal by combining the base-band digital amplitude-modulation signal with the pulse signal.

20. The signal modulation device of claim 18, wherein the base-band digital amplitude-modulation signal is converted to a plurality of phase-differentiated analog signals in a plurality of input stages.

* * * * *